United States Patent
Wirth et al.

(10) Patent No.: US 6,840,153 B2
(45) Date of Patent: Jan. 11, 2005

(54) FIRE PROTECTION IN A PISTON-CYLINDER UNIT

(75) Inventors: Peter Wirth, Schonungen (DE);
Wolfgang Bach, Oberwerrn (DE);
Hassan Asadi, Schweinfurt (DE);
Gerald Fenn, Poppenhausen (DE);
Hans Luksch, Kirchlauter (DE)

(73) Assignee: ZF Sachs AG, Schweinfurt (DE)

( * ) Notice: Subject to any disclaimer, the term of this patent is extended or adjusted under 35 U.S.C. 154(b) by 106 days.

(21) Appl. No.: 10/308,600

(22) Filed: Dec. 3, 2002

(65) Prior Publication Data

US 2003/0110942 A1 Jun. 19, 2003

(30) Foreign Application Priority Data

Dec. 6, 2001 (DE) .......................... 101 59 935

(51) Int. Cl.[7] .............................. F16J 15/18
(52) U.S. Cl. ......................... 92/168; 277/917
(58) Field of Search .............................. 92/168; 277/917

(56) References Cited

U.S. PATENT DOCUMENTS

| | | | |
|---|---|---|---|
| 2,954,670 A | * | 10/1960 | Helus et al. ................ 137/318 |
| 3,229,848 A | * | 1/1966 | Chabala ..................... 137/68.3 |
| 4,931,688 A | | 6/1990 | Tosswill |
| 4,988,081 A | | 1/1991 | Dohrmann |
| 5,064,030 A | | 11/1991 | Wöner |
| 5,454,455 A | | 10/1995 | Kundmüller et al. |
| 5,485,987 A | | 1/1996 | Jobelius et al. |

FOREIGN PATENT DOCUMENTS

DE      42 16 573      11/1993

* cited by examiner

Primary Examiner—F. Daniel Lopez
(74) Attorney, Agent, or Firm—Cohen, Pontani, Lieberman & Pavane

(57) ABSTRACT

Piston-cylinder unit comprising a cylinder in which a work space is filled with a work medium and which is limited by a closure and is sealed by at least one seal. The closure is fixed axially by a positive engagement with the cylinder up to a temperature threshold and the closure can carry out an axial movement for relieving pressure above the temperature threshold. A cutting device cancels the sealing function of the seal during the axial movement of the closure for relieving pressure.

20 Claims, 2 Drawing Sheets

FIRE PROTECTION IN A PISTON-CYLINDER UNIT

BACKGROUND OF THE INVENTION

1. Field of the Invention

The invention is directed to a piston-cylinder unit including a cylinder having an inner wall bounding a work space filled with a working medium, and a closure fixed axially with respect to the cylinder by position engagement with the cylinder. The closure bounds the work space and is sealed with respect to the wall by a circumferential seal, the closure being axially movable with respect to the cylinder when a temperature threshold is exceeded.

2. Description of the Related Art

It can not be ruled out in principle that a piston-cylinder unit is subject to extreme temperature loading during operation, for example, in case of an automobile accident in which the vibration damper of the motor vehicle is exposed to fire. The work medium found in the piston-cylinder unit undergoes a very great expansion, so that a push-out force acting on the piston rod and a closure overloads the fastening of the piston rod guide within the cylinder which is designed for normal operation. In theory, it may happen that the piston rod together with the piston is pushed out of the cylinder due to the pressure level within the piston-cylinder unit.

Solutions have already been suggested for this scenario. U.S. Pat. No. 5,454,455 discloses that at least one bead provides a stop surface for the piston rod-piston unit which moves out. This solution requires an adapted piston and in some cases leads to a loss of useful stroke because the bead is formed within the travel path of the piston.

U.S. Pat. No. 5,485,987 discloses several possibilities for reducing overpressure in a gas spring. For this purpose, the gas spring has a supporting body for the piston rod seal, which supporting body is constructed elastically in itself or is supported in a springing manner and releases a flow-out opening within an axial displacement path of the piston rod seal. However, there is also a solution in which the piston rod seal is destroyed by the increased operating pressure and an outlet channel is released. The possibilities shown in this reference require a supporting body whose inherent elasticity can be tuned to a defined temperature only with difficulty. A piston rod seal with a predetermined breaking point is at least appreciably more expensive than a conventional construction.

U.S. Pat. No. 4,988,081 discloses a safety fuse which releases a flow-out opening of the cylinder in case of fire. U.S. Pat. No. 5,064,030 is also to be mentioned in this connection. With respect to safety fuses, it can happen that the seal will lose its original contour and become mushy but will still continue to exert a sealing function.

SUMMARY OF THE INVENTION

It is the object of the present invention to realize a safety mechanism for extreme temperature loading in a piston-cylinder unit which functions in a reliable manner without significantly increasing expenditure and without impairing the functioning of the unit itself.

According to the invention, this object is met in that a cutting device cancels the sealing function of the seal during the axial movement of the closure for relieving pressure.

A substantial advantage of the invention consists in that it is not necessary to rely upon the melting behavior of the seal for the work medium to flow off.

It is further provided that the cutting device is arranged inside the cylinder. Add-on components which would take up additional external installation space are not necessary.

According to an advantageous embodiment, the cutting device is supported at the cylinder. The cylinder is generally designed as a pressure vessel and can absorb very high forces.

For the lowest possible expenditure on manufacturing, the cutting device is constructed integral with the cylinder. There is no need for additional structural component parts which would add to manufacturing costs. The cutting device is formed by a tongue-like projection.

For optimum reliability of operation, the seal is arranged within a groove of the closure, and the radial groove depth is greater than the radial dimension of the cutting device. It is ensured that the cutting device can engage in the functional area of the seal.

In order to prevent metallic sealing locations after the cutting process, a cutting surface of the cutting device is arranged entirely radially inside of the cylinder. In this connection, the cutting device has a stripping surface which removes the cut off portion of the closure from a core part.

In addition, the cylinder has a free space which can receive the cut off part of the closure.

The cutting device can be produced at relatively low cost in that the tongue-like projection of the cutting device is cut from the wall of the cylinder and the free cut for the projection forms the free space.

The closure has a circumferentially extending groove receiving the tongue-like projection of the cutting device, so that the cutting device does not need any additional external installation space.

Depending on the construction, the cutting surface can contact a side wall of the groove in the closure in normal operation of the piston-cylinder unit. Accordingly, it is possible that the cutting device provides additional holding or retaining forces for the closure.

Installation space in the cylinder is made use of in a particularly favorable manner in that the circumferentially extending groove in the closure for the cutting device with at least one bead of the cylinder forms the positive engagement for the axial fastening of the closure within the cylinder.

It is possible to use several cutting devices which enables a faster decrease in pressure in the cylinder.

Further, when using more than one cutting device it is useful to let these cutting devices act on the circumference of the closure asymmetrically. The cutting process causes the closure to assume an oblique state relative to the longitudinal axis of the piston-cylinder unit, so that a clamping force can be used to hold the closure in the cylinder.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
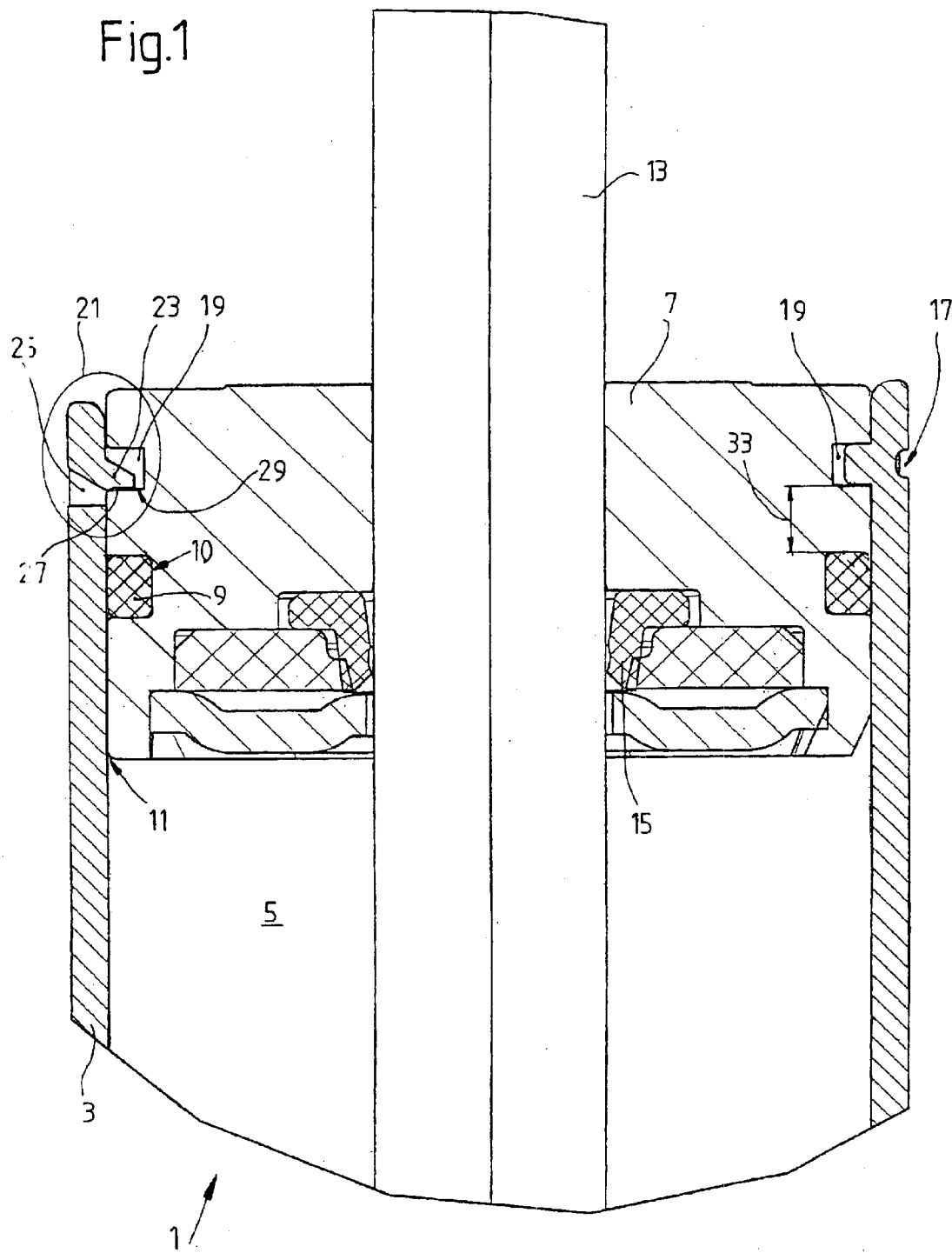
FIG. 1 shows a section from a piston-cylinder unit in the area of the closure.

FIG. 1 shows a section from a piston-cylinder unit 1. This embodiment example concerns a vibration damper constructed according to the single-tube principle. A cylinder 3 has a work space 5 which is filled with a work medium and which is limited at the end by a closure 7. A seal 9 inside a groove 10 closes an annular gap 11 between the inner wall of the cylinder and the outer surface of the closure. An axially movable piston rod 13 is enclosed by a piston rod seal 15 which prevents leakage at the inner diameter of the closure.

The closure is held in its predetermined position by a positive engagement with the cylinder in the range of normal operating temperature. For this purpose, the cylinder has a quantity of beads 17 which extend in circumferential direction and engage in a circumferentially extending groove 19 of the closure.

The section on the left-hand side of FIG. 1 shows a cutting device 21 inside the cylinder 3. The cutting device 21 is supported at the cylinder in that it is formed integral with a tongue-like projection 23 of the cylinder 3 which is received by the circumferentially extending groove 19. The tongue-like projection 23 of the cutting device is cut from the wall of the cylinder and has a free space 25. A cutting surface 27 of the tongue-like projection is constructed completely radially inside the cylinder. Further, the groove depth of the groove 10 for the seal 9 is greater than the radial dimension of the cutting device 21. In this embodiment example, the cutting surface 27 contacts a side wall 29 of the circumferentially extending groove 19 in normal operation of the piston-cylinder unit and ensures an additional retaining force in addition to the beads 17 already mentioned.

Although only one cutting device is shown, several such cutting devices can also be used, but should be allowed to act on the circumference of the closure asymmetrically so as to make use of an oblique state and the consequent clamping forces between the closure and the cylinder.

In case of fire when the piston-cylinder unit is mounted in a motor vehicle, for example, and this motor vehicle catches fire in an accident, the temperature at the cylinder rises above a normal operating temperature threshold determined by the construction of the piston-cylinder unit. The work medium is likewise heated and, in so doing, necessarily expands. A pressure force exceeding the retaining force of the beads 17 in the circumferentially extending groove 19 acts at the underside of the closure 7, so that the positive engagement between the closure and the cylinder is canceled, particularly in closures whose material has a thermal resistance lower than that of the cylinder. After this loading point, the closure carries out an axial movement in which the tongue-like projection 23 penetrates into the side wall 29 of the groove by its cutting surface 27 and displaces severed parts of the closure from a core part by a strip-off surface 31. Portions 7a severed from the volume of the closure are displaced into the free space 25.

Figure 2:
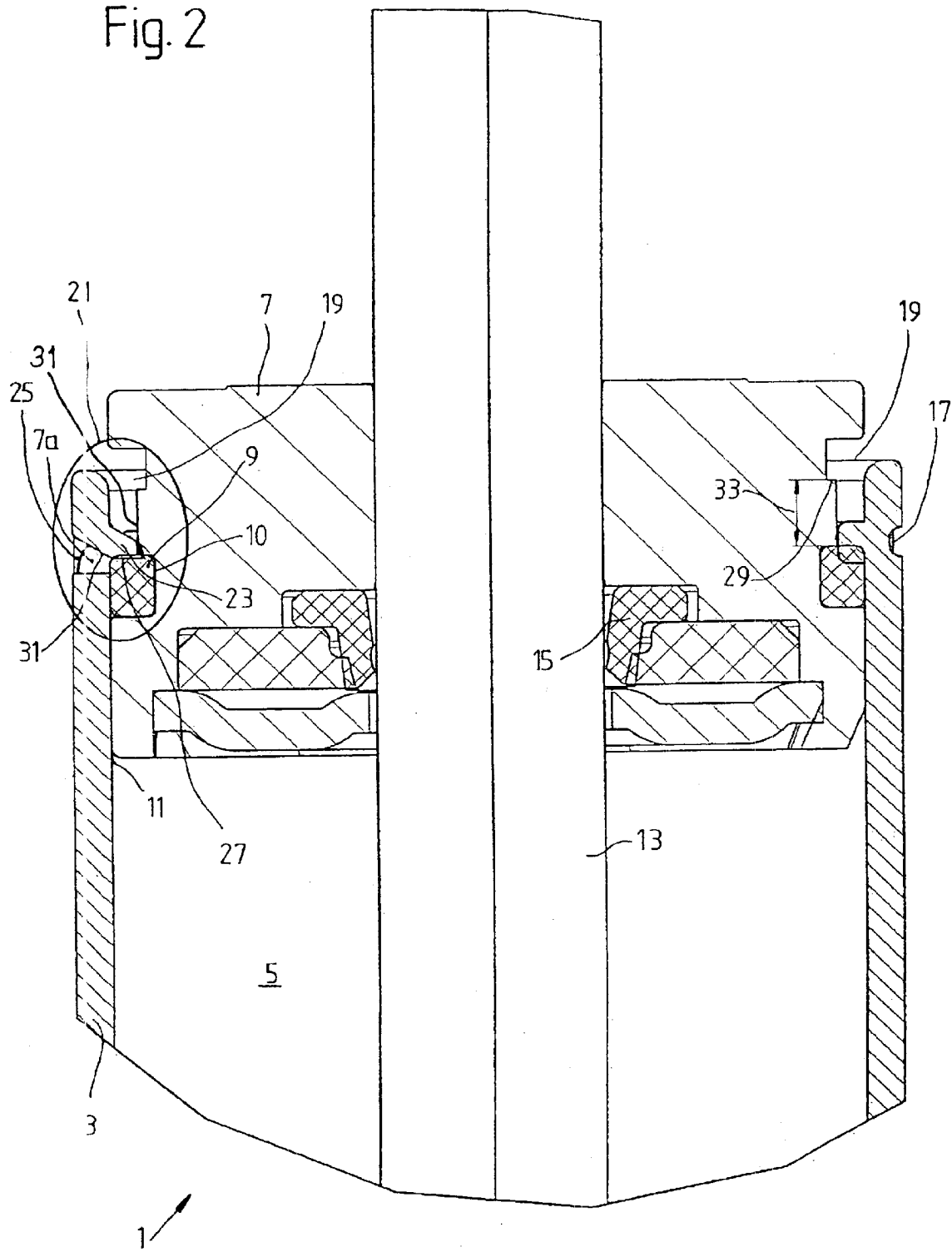
FIG. 2 shows a piston-cylinder unit after the temperature limit has been exceeded.

FIG. 2 shows the state in which a shoulder 33 between the circumferentially extending groove 19 and the groove 10 for the seal 9 is severed and the cutting surface 27 acts at the seal 9. With a further movement, the seal 9 is destroyed, so that the work medium can escape through the annular gap 11 into the free space or along the severed shoulder 33 into the surroundings.

Extensive tests have shown that no metallic sealing locations are formed between the closure and the inner wall. Further, the technical expenditure on manufacturing is comparatively small because an embossing cutting tool is used for the tongue-like projection 23 instead of a beading die for the beads 17.

The cutting device functions not only in connection with a positive engagement in the form of a bead, but also completely independent from the latter. A threaded connection or a clamped in wire ring can also be used instead of the bead connection. At corresponding temperatures, these positive engagements also tear and allow the cutting device to take effect.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A piston-cylinder unit comprising:
   a cylinder having an inner wall bounding a work space filled with a working medium;
   a closure fixed axially with respect to said cylinder by positive engagement with the cylinder, said closure bounding said work space and being sealed with respect to said inner wall by a circumferential seal, said closure being axially moveable with respect to said cylinder when a temperature threshold is exceeded; and
   a cutting device which cuts said seal as said closure moves axially with respect to said cylinder, whereby said working medium can escape from said working space,
   wherein said cutting device is formed as a tongue-like projection formed integrally with said cylinder and extending radially inward from said inner wall.

2. A piston-cylinder unit as in claim 1 wherein said closure comprises a circumferential groove which receives said seal, said groove having a radial depth which is greater than the radial dimension of said cutting device.

3. A piston-cylinder unit as in claim 1 wherein said cutting device has a cutting surface which is arranged entirely radially inside of said inner wall.

4. A piston-cylinder unit as in claim 1 wherein said cutting device cuts off a portion of said closure as said closure moves axially with respect to said cylinder, said cutting device having a stripping surface which removes the cut off portion of the closure.

5. A piston-cylinder unit as in claim 4 wherein said cylinder has a free space which can receive said cut off portion of said closure.

6. A piston-cylinder unit as in claim 5 wherein said tongue-like projection is formed out of said free space.

7. A piston-cylinder unit as 1 wherein said closure comprises a circumferential groove which receives said tongue-like projection, said circumferential groove having a side wall.

8. A piston-cylinder unit as in claim 7 wherein said tongue-like projection has a cutting surface which contacts said side wall prior to movement of said closure with respect to said cylinder.

9. A piston-cylinder unit as in claim 7 wherein said closure comprises at least one bead which is received in said groove to fix said closure axially with respect to said cylinder.

10. A piston-cylinder unit as in claim 1 comprising a plurality of said cutting devices.

11. A piston-cylinder unit as in claim 10 wherein said cutting devices are situated asymmetrically about the axis of said cylinder.

12. A piston-cylinder unit comprising:
   a cylinder having an inner wall bounding a work space filled with a working medium;
   a closure fixed axially with respect to said cylinder by positive engagement with the cylinder, said closure bounding said work space and being sealed with respect to said inner wall by a circumferential seal, said closure being axially moveable with respect to said cylinder when a temperature threshold is exceeded; and
   a cutting device which cuts said seal as said closure moves axially with respect to said cylinder, whereby said working medium can escape from said working space,
   wherein said cutting device cuts off a portion of said closure as said closure moves axially with respect to said cylinder, said cutting device having a stripping surface which removes the cut off portion of the closure.

13. A piston-cylinder unit as in claim 12 wherein said closure comprises a circumferential groove which receives said seal, said groove having a radial depth which is greater than the radial dimension of said cutting device.

14. A piston-cylinder unit as in claim 12 wherein said cutting device has a cutting surface which is arranged entirely radially inside of said inner wall.

15. A piston-cylinder unit as in claim 12 wherein said cylinder has a free space which can receive said cut off portion of said closure.

16. A piston-cylinder unit as in claim 15 wherein said cutting device is a tongue-like projection formed integrally with said cylinder, said tongue-like projection being formed out of said free space.

17. A piston-cylinder unit comprising:
   a cylinder having an inner wall bounding a work space filled with a working medium;
   a closure fixed axially with respect to said cylinder by positive engagement with the cylinder, said closure bounding said work space and being sealed with respect to said inner wall by a circumferential seal, said closure being axially moveable with respect to said cylinder when a temperature threshold is exceeded; and
   a plurality of cutting devices situated asymmetrically about the axis of the cylinder, wherein each said cutting device cuts said seal as said closure moves axially with respect to said cylinder, whereby said working medium can escape from said working space.

18. A piston cylinder unit as in claim 17 wherein each said cutting device is located radially inside said inner wall of said cylinder.

19. A piston-cylinder unit as in claim 18 wherein said closure comprises a circumferential groove which receives said seal, said groove having a radial depth which is greater than the radial dimension of said cutting device.

20. A piston-cylinder unit as in claim 18 wherein each said cutting device has a cutting surface which is arranged entirely radially inside of said inner wall.

* * * * *